(12) United States Patent
Cymbal

(10) Patent No.: US 6,176,151 B1
(45) Date of Patent: Jan. 23, 2001

(54) CONNECTION FOR ENERGY ABSORBING STEERING COLUMN

(75) Inventor: William David Cymbal, Freeland, MI (US)

(73) Assignee: Delphi Technologies, Inc., Troy, MI (US)

(*) Notice: Under 35 U.S.C. 154(b), the term of this patent shall be extended for 0 days.

(21) Appl. No.: 09/306,329

(22) Filed: May 6, 1999

(51) Int. Cl.[7] ............................................. B62D 1/16
(52) U.S. Cl. .................................. 74/492; 280/777
(58) Field of Search ................. 74/492; 280/777; 403/2, 407.1, 326, 329

(56) References Cited

U.S. PATENT DOCUMENTS

| | | | |
|---|---|---|---|
| 3,392,599 | | 7/1968 | White et al. ........................ 74/492 |
| 3,747,427 | * | 7/1973 | Milton et al. ........................ 74/492 |
| 3,795,038 | | 3/1974 | Brezinski et al. ................... 29/417 |
| 3,868,864 | * | 3/1975 | Durkee et al. ...................... 74/492 |
| 4,102,217 | * | 7/1978 | Yamamoto et al. ................. 74/492 |
| 4,274,299 | * | 6/1981 | Jones .................................. 74/492 |
| 4,643,610 | * | 2/1987 | Bien ................................. 403/407.1 |
| 4,884,778 | * | 12/1989 | Yamamoto ...................... 74/492 X |
| 5,390,955 | * | 2/1995 | Kaliszewski et al. ............. 280/777 |
| 5,425,553 | * | 6/1995 | Yazane et al. .................... 280/777 |
| 5,609,364 | * | 3/1997 | Fouquet et al. ................... 280/777 |
| 5,653,550 | * | 8/1997 | Mutz et al. ....................... 403/329 |
| 5,673,938 | * | 10/1997 | Kaliszewski ...................... 280/777 |
| 5,704,254 | * | 1/1998 | Thomas ............................. 74/492 |
| 5,706,704 | * | 1/1998 | Riefe et al. ..................... 74/492 X |
| 5,738,377 | * | 4/1998 | Sugiki et al. ..................... 280/777 |
| 5,775,172 | * | 7/1998 | Fevre et al. ....................... 74/492 |
| 5,803,650 | * | 9/1998 | Wu .................................... 403/329 |
| 5,819,592 | * | 10/1998 | Lewandowski et al. .......... 74/492 |
| 5,899,116 | * | 5/1999 | Armstrong et al. ................ 74/492 |
| 6,062,100 | * | 5/2000 | Sarsfield et al. ................... 74/492 |

* cited by examiner

Primary Examiner—Lenard A. Footland
Assistant Examiner—Colby Hansen
(74) Attorney, Agent, or Firm—Edmund P. Anderson

(57) ABSTRACT

A connection between a collapsible mast jacket of an energy absorbing steering column and a motor vehicle body including a mounting bracket on the mast jacket having a planar flange, a capsule slot in the planar flange, and a snap-in capsule. The snap-in capsule includes a retaining channel, an integral cantilever spring, and a detent lug on the end of the cantilever spring which overlaps the retaining channel. When the snap-in capsule is pushed into the capsule slot, the retaining channel cooperates with a peripheral edge of the capsule slot in guiding the snap-in capsule and in retaining the snap-in capsule perpendicular to the planar flange. Concurrently, the detent lug is ejected from the retaining channel against a restoring force attributable to resilient flexure of the cantilever spring. When the snap-in capsule attains a seated position in the capsule slot, the cantilever spring snaps the detent lug into a detent notch in the planar flange. A fastener clamps the snap-in capsule to a body structure of the motor vehicle and immobilizes the cantilever spring to prevent release of the planar flange from the snap-in capsule except by fracture of the detent lug.

5 Claims, 2 Drawing Sheets

CONNECTION FOR ENERGY ABSORBING STEERING COLUMN

TECHNICAL FIELD

This invention relates to a connection between an energy absorbing steering column and a body of a motor vehicle.

BACKGROUND OF THE INVENTION

U.S. Pat. No. 3,392,599, issued Jul. 16, 1968 and assigned to the assignee of this invention, describes an energy absorbing steering column for a motor vehicle including a tubular mast jacket which collapses longitudinally through an energy absorbing stroke in response to an impact on the steering column. An upper or outboard connection between the mast jacket and a body of the motor vehicle includes a mounting bracket on the mast jacket having a pair of lateral flanges, a pair of open slots in the lateral flanges, a pair of capsules slidably mounted in the slots and rigidly clamped to the vehicle body, and a plurality of injection molded plastic pins which couple the capsules to the lateral flanges of the mounting bracket. The mast jacket is released for energy absorbing collapse when the plastic pins between the capsules and the mounting bracket are fractured by impact forces on the steering column. U.S. Pat. Nos. 3,795,038 and 3,868,864, issued Mar. 5, 1974 and Mar. 4, 1975 and assigned to the assignee of this invention, describe energy absorbing steering columns having similar connections in which retention between the capsules and the mounting bracket is by, respectively, tangs on the mounting bracket bent behind the capsules and tangs on the capsules bent into notches in the mounting bracket. U.S. Pat. No. 3,747,427, issued Jul. 24, 1973 and assigned to the assignee of this invention, describes an energy absorbing steering column having a similar connection in which retention between the capsules and the mounting bracket is by friction. The connection according to this invention between a mast jacket of an energy absorbing steering column and a body of a motor vehicle is a novel alternative to the upper or outboard connections described in the aforesaid U.S. Pat. Nos. 3,392,599, 3,795,038, 3,868,864 and 3,747,427.

SUMMARY OF THE INVENTION

This invention is a new and improved upper or outboard connection between a collapsible mast jacket of an energy absorbing steering column and a body of a motor vehicle including a mounting bracket on the mast jacket having a planar flange parallel to a longitudinal centerline of the steering column, a capsule slot in the planar flange, and a snap-in capsule. The snap-in capsule includes a retaining channel, an integral cantilever spring, and a detent lug on the end of the cantilever spring which overlaps the retaining channel. When the snap-in capsule is pushed into the capsule slot, the retaining channel cooperates with a peripheral edge of the capsule slot in guiding the snap-in capsule and in retaining the snap-in capsule perpendicular to the planar flange. Concurrently, the detent lug is ejected from the retaining channel against a restoring force attributable to resilient flexure of the cantilever spring. When the snap-in capsule attains a seated position in the capsule slot, the cantilever spring snaps the detent lug into a detent notch in the planar flange. A fastener clamps the snap-in capsule to a body structure of the motor vehicle and immobilizes the cantilever spring to prevent release of the planar flange from the snap-in capsule except by fracture of the detent lug.

DESCRIPTION OF THE PREFERRED EMBODIMENT

Figure 1:
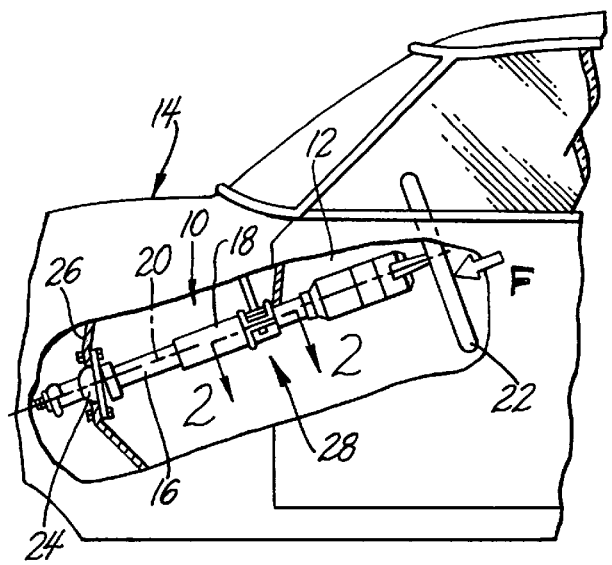
FIG. 1 is a fragmentary, partially broken-away view of a motor vehicle having an energy absorbing steering column attached to a body of the motor vehicle through a connection according to this invention.

Referring to FIG. 1, an energy absorbing steering column 10 is disposed in a passenger compartment 12 of a motor vehicle body 14. The steering column 10 may have the construction described in the aforesaid U.S. Pat. No. 3,392,599, the disclosure of which is incorporated herein by reference. The steering column 10 includes, generally, a lower mast jacket 16, an upper mast jacket 18 telescopically overlapping the lower mast jacket, and an energy absorber, not shown, in the overlap between the upper and the lower mast jackets. The energy absorber provides a calibrated resistance to linear translation or collapse of the upper mast jacket relative to the lower mast jacket in the direction of a longitudinal centerline 20 of the steering column. A steering shaft, not shown, is supported on the steering column for rotation about the longitudinal centerline thereof A steering hand wheel 22 is rigidly attached to the top of the steering shaft outboard of the upper mast jacket 18.

The lower mast jacket 16 is connected to the body 14 of the motor vehicle through a schematically represented lower bracket assembly 24 attached to a vertical panel 26 of the body. An impact force on the steering column represented by a schematic force vector "F" on the steering hand wheel 22 induces collapse of the upper mast jacket relative to the lower mast jacket and is reacted to the vehicle body through the lower bracket assembly 24. The upper mast jacket 18 is attached to the vehicle body 14 by an upper or outboard connection 28 according to this invention.

Figure 2:
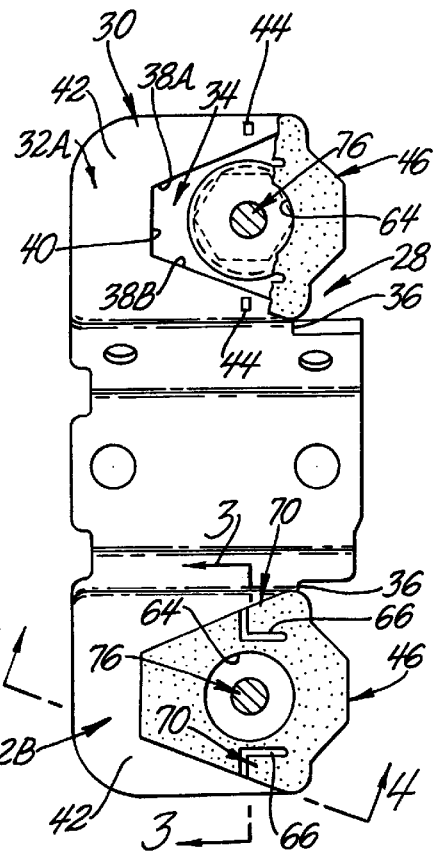
FIG. 2 is an enlarged, partially broken-away sectional view taken generally along the plane indicated by lines 2—2 in FIG. 1.
Figure 3:
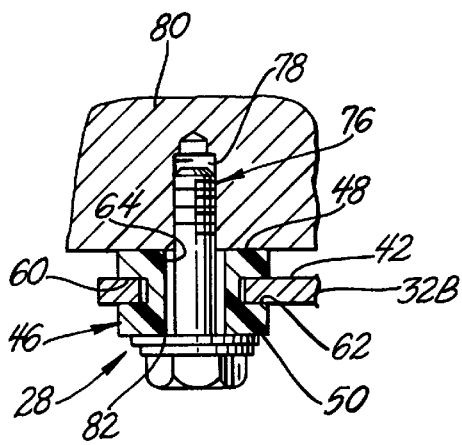
FIG. 3 is a sectional view taken generally along the plane indicated by lines 3—3 in FIG. 2.

As seen best in FIGS. 2–3, the connection 28 includes a U-shaped mounting bracket 30 rigidly attached to the upper mast jacket 18 having a pair of planar flanges 32A,32B on opposite sides of the upper mast jacket in a plane parallel to the longitudinal centerline 20 of the steering column each having a capsule slot 34 therein. Each capsule slot 34 has an open end through a back edge 36 of the mounting bracket 30 and a peripheral edge constituted by a pair of side edges 38A,38B converging toward a narrow end edge 40. An upper surface 42 of each planar flange 32A,32B is interrupted by a pair detent notches 44 adjacent the converging side edges 38A,38B of the corresponding capsule slot therein.

Each of a pair of identical snap-in capsules 46 of the connection 28 includes a flat top 48, a flat bottom 50, a wide end 52, a narrow end 54, and a pair of converging sides 56A,56B matching the convergence of the side edges 38A, 38B of the capsule slots 34. The sides 56A,56B and the narrow end 54 of each snap-in capsule are interrupted by a retaining channel 58 having a top surface 60 and a bottom surface 62. Each snap-in capsule is perforated by a large aperture 64 in the middle thereof between the flat top 48 and the flat bottom 50.

Figure 6:
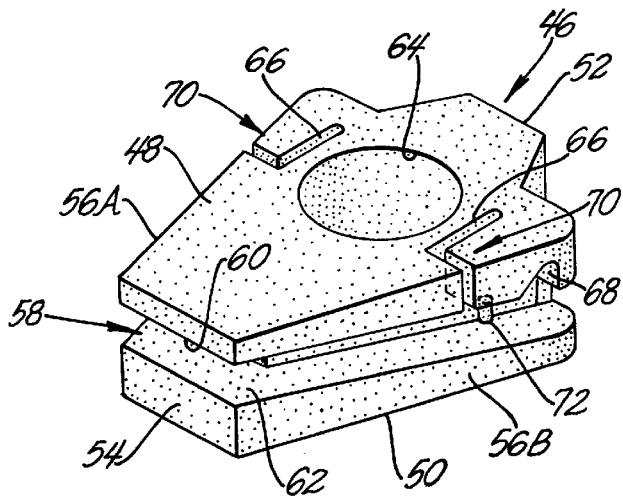
FIG. 6 is an enlarged perspective view of a snap-in capsule of the connection according to this invention.
Figure 4:
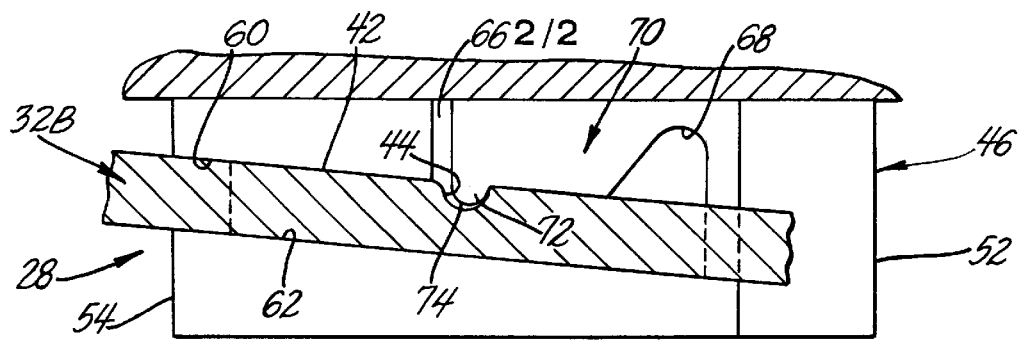
FIG. 4 is a sectional view taken generally along the plane indicated by lines 4—4 in FIG. 2.
Figure 5:
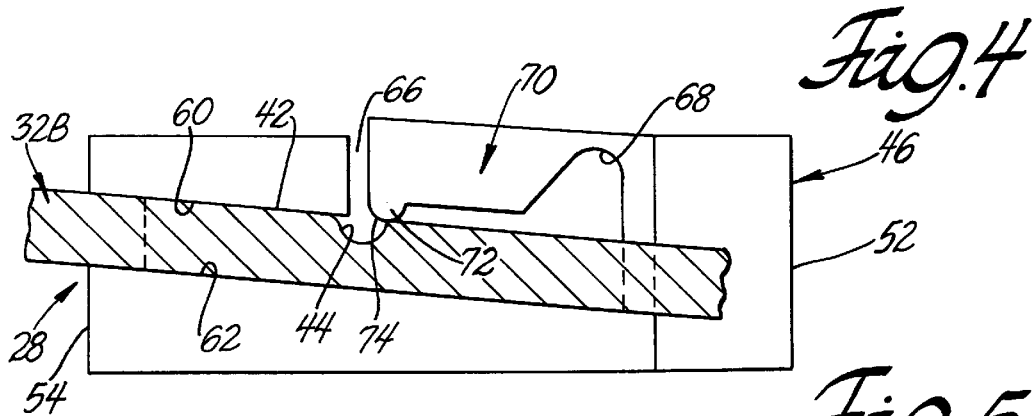
FIG. 5 is similar to FIG. 4 but showing structural elements of the connection according to this invention in different relative positions.

As seen best in FIGS. 2 and 6, each of the snap-in capsules 46 has a pair of L-shaped slots 66 therein intersecting the flat top 48 thereof and the top surface 60 of the retaining channel 58 therein along the converging sides 56A,56B. The top surface 60 of the retaining channel 58 in each snap-in capsule is further interrupted by a pair of lateral notches 68 under respective ones of the L-shaped slots 66. The portions of the snap-in capsules outlined by the L-shaped slots 66 and the lateral notches 68 constitute respective ones of a pair of integral cantilever springs 70 on the snap-in capsules resiliently flexible perpendicular to the flat tops 48 and to the top surfaces 60. Each of the integral cantilever springs 70 has a detent lug 72 thereon intersecting the corresponding retaining channel 58 through the plane of the top surface 60 thereof Each detent lug 72 has a spherical surface portion 74 defining a cam thereon.

As seen best in FIGS. 2–5, the snap-in capsules 46 attach to the mounting bracket 30 in respective ones of the capsule slots 34 without resort to secondary manufacturing operations such as in situ injection molding plastic pins as described in the aforesaid U.S. Pat. No. 3,392,599. More particularly, the snap-in capsules 46 are aligned horizontally with respective ones of the planar flanges 32A,32B facing the open ends of the capsule slots 34 therein and linearly translated into the capsule slots. The retaining channels 58 in the snap-in capsules slidably receive and cooperate with the peripheral edges of the capsule slots in guiding the capsules during linear translation.

In an intermediate position, not shown, of each snap-in capsule 46 defined by engagement of the back edge 36 of the mounting bracket on the spherical surfaces 74 on the detent lugs, the detent lugs are ejected from the retaining channel 58 against restoring forces attributable to resilient flexure of the cantilever springs 70 perpendicular to the flat top 48 of the snap-in capsule. Thereafter, the detent lugs slide over the upper surfaces 42 of the planar flanges, FIG. 5, as each of the snap-in capsules is pushed further into the corresponding capsule slot. Linear translation of each of the snap-in capsules into the corresponding capsule slot is limited to a seated position, FIGS. 2 and 4, of the snap-in capsule defined by engagement of the back of the retaining channel 58 thereon on the peripheral edge of the capsule slot constituted by the side edges 38A,38B and the end edge 40 thereof As each snap-in capsule approaches its seated position, FIG. 5, the detent lugs 72 thereon approach register with corresponding ones of the detent notches 44 in the upper surface of the corresponding one of the planar flanges 32A,32B. When each snap-in capsule attains its seated position, the cantilever springs 70 thereon snap the detent lugs 72 into the detent notches 44 while resiliently returning to the plane of the flat top of the snap-in capsule. The detent lugs then cooperate with the detent notches in preventing dislodgment of the snap-in capsules from the capsule slots through the open ends of the latter while the retaining channels 58 cooperate with the peripheral edges of the capsule slots in preventing dislodgment of the snap-in capsules from the capsule slots perpendicular to the planar flanges.

With the snap-in capsules 46 thus retained on the mounting bracket 30, respective ones of a pair of mounting bolts 76 are inserted through corresponding ones of the large apertures 64 in the snap-in capsules and screwed into respective ones of a pair of screw-threaded bores 78, FIG. 3, in a schematically represented structural element 80 of the body 14 of the motor vehicle. The mounting bolts 76 rigidly clamp the snap-in capsules 46 to the structural element 80 with an integral flat washer 82 on each of the mounting bolts bearing against the flat bottom 50 of the corresponding one of the snap-in capsules and with the flat top 48 of each of the snap-in capsules clamped flush against the structural element 80. With the snap-in capsules thus rigidly attached to the structural element 80, the upper mast jacket 18 of the steering column 10 is supported vertically through the mounting bracket 30.

When the steering column is impacted on the steering hand wheel 22 by a force represented by the schematic force vector F, FIG. 1, the impact force is initially reacted to the vehicle body through the planar flanges 32A,32B on the mounting bracket 30, the detent lugs 72 on the snap-in capsules and the detent notches 44 in the planar flanges, and the mounting bolts 76. Importantly, while the impact force quickly exceeds the magnitude necessary for the detent lugs to be cammed out of the detent notches and thereby ejected from the retaining channels 58, the impact force is prevented from doing so because the cantilever springs are captured flush with the flat tops 48 of the snap-in capsules and thus immobilized with respect to resilient flexure out of the planes of the flat tops. Instead, when the magnitude of the impact force exceeds the structural integrity of the material from which the snap-in capsules 46 are made, e.g. structural plastic, the detent lugs 72 fracture from the cantilever springs 70. In that circumstance, the planar flanges 32A,32B are released for relative separation from the snap-in capsules and the upper mast jacket 18 is released from the vehicle body for energy absorbing collapse in the direction of the longitudinal centerline 20 of the steering column. It is an important feature of this invention that the detent lugs must fracture to release the mounting bracket because the force at which such fracture occurs is relatively easily controlled by controlling the physical dimensions of the detent lugs and the detent notches.

Figure 7:
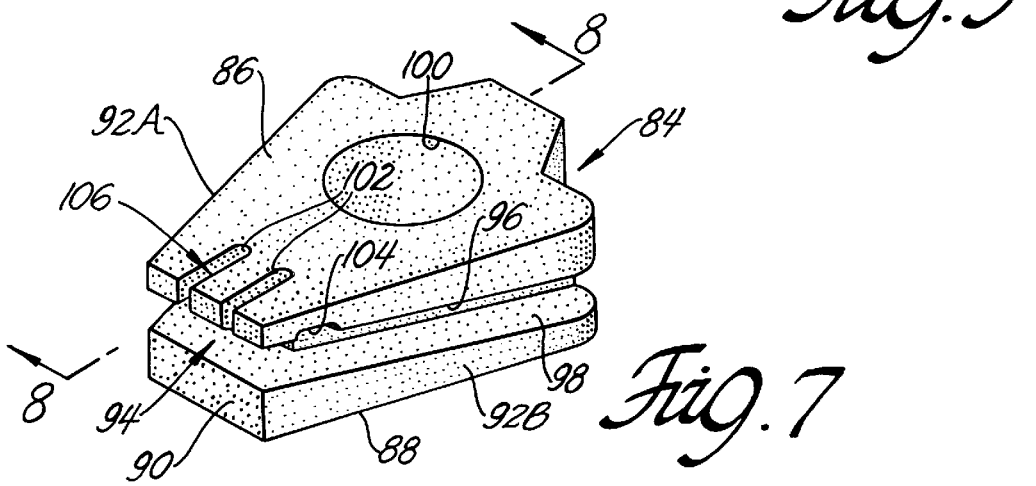
FIG. 7 is similar to FIG. 6 but illustrating a modified snap-in capsule of a modified embodiment of the connection according to this invention.
Figure 8:
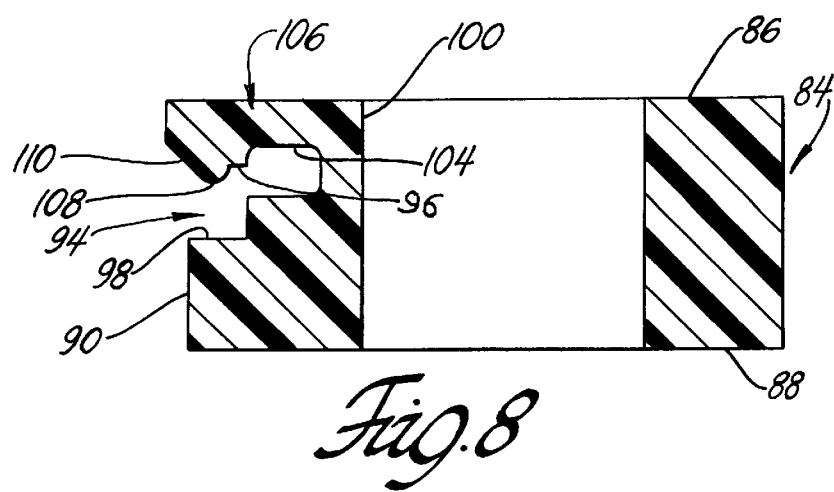
FIG. 8 is a sectional view taken generally along the plane indicated by lines 8—8 in FIG. 7.

A modified connection according to this invention is identical to the connection 28 described above except in the structure of a modified snap-in capsule 84, FIGS. 7–8. More particularly, the modified snap-in capsule 84 includes a flat top 86, a flat bottom 88, a narrow end 90, and a pair of converging sides 92A,92B matching the convergence of the side edges 38A,38B of the capsule slots 34. The sides 92A,92B and the narrow end 90 of the modified snap-in capsule 84 are interrupted by a retaining channel 94 having a top surface 96 and a bottom surface 98. The modified snap-in capsule is perforated by a large aperture 100 in the middle thereof between the flat top 86 and the flat bottom 88.

The modified snap-in capsule 84 has a pair of linear slots 102 therein at the narrow end 90 thereof intersecting the flat top 86 and the top surface 96 of the retaining channel 94 at the narrow end of the modified snap-in capsule. The top surface 96 of the retaining channel 94 is further interrupted by a notch 104 parallel to the narrow end of the modified snap-in capsule. The portion of the modified snap-in capsule between the linear slots 102 and above the notch 104 constitutes a cantilever spring 106 on the modified snap-in capsule resiliently flexible perpendicular to the flat top 86 and to the top surface 96. The integral cantilever spring 106 has a detent lug 108 thereon intersecting the retaining channel 94 through the plane of the top surface 96 thereof The detent lug 108 has a ramp 110 thereon defining a cam.

Respective ones of a pair of the modified snap-in capsules 84 are inserted in the capsule slots 34 in the mounting bracket 30 as described above with respect to the snap-in capsules 46. As each modified snap-in capsule approaches its seated position in the corresponding capsule slot, the end edge 40 of the capsule slot engages the cam on the detent lug 108 defined by the ramp 110 thereon and ejects the detent lug from the retaining channel 94 against a restoring force attributable to resilient flexure of the cantilever spring 106. When each modified snap-in capsule attains its seated position, the cantilever spring 106 thereon snaps the detent lug 108 into a detent notch in the corresponding one of the planar flanges 32A,32B adjacent to the narrow end edge 40 of the capsule slot therein while resiliently returning to the plane of the flat top 86 of the modified snap-in capsule. The detent lugs then cooperate with the detent notches in preventing dislodgment of the modified snap-in capsules from the capsule slots.

With the modified snap-in capsules 84 thus retained on the mounting bracket, the mounting bolts 76 are inserted through corresponding ones of the large apertures 100 in the modified snap-in capsules and screwed into screw-threaded bores in the structural element 80 of the body 14 of the motor vehicle. The mounting bolts rigidly clamp the modified snap-in capsules to the structural element 80 with the cantilever springs 106 immobilized as described above with respect to the cantilever springs 70 whereby the upper mast jacket 18 is supported vertically on the structural element 80. With the cantilever springs 106 thus immobilized, an impact force on the steering column represented by the schematic force vector F, FIG. 1, fractures the detent lugs 108 from the cantilever springs 106 to release the planar flanges 32A,32B from the modified snap-in capsules for energy absorbing collapse of the upper mast jacket 18.

Having thus described the invention, what is claimed is:

1. A connection between a motor vehicle body and a mast jacket of a steering column collapsible in the direction of a longitudinal centerline of the steering column in response to an impact thereon comprising:

a mounting bracket rigidly attached to the mast jacket having a planar flange parallel to the longitudinal centerline of the steering column, a capsule slot in the planar flange having an open end and a peripheral edge constituted by a pair of side edges and an end edge of the capsule slot, a snap-in capsule having a retaining channel in an edge thereof slidably receiving the peripheral edge of the capsule slot when the capsule is translated into the capsule slot through the open end thereof to a seated position and cooperating with the peripheral edge of the capsule slot in retaining the snap-in capsule on the mounting bracket perpendicular to the planar flange, an integral cantilever spring on the snap-in capsule resiliently flexible perpendicular to a flat top of the snap-in capsule, a detent lug on the integral cantilever spring disposed in the retaining channel, a detent notch in the planar flange, a cam means operative to eject the detent lug from the retaining channel against a restoring force attributable to resilient flexure of the integral cantilever spring when the snap-in capsule is linearly translated in the capsule slot toward the seated position thereof, the integral cantilever spring snapping the detent lug into the detent notch when the snap-in capsule attains the seated position in the capsule slot thereby to prevent relative separation between the snap-in capsule and the planar flange through the open end of the capsule slot, and a clamp means operative to rigidly clamp the snap-in capsule to a body structure of the motor vehicle with the flat top thereof flush against the body structure so that the mast jacket is supported vertically on the body structure and the integral cantilever spring is immobilized to prevent release of the planar flange from the snap-in capsule except by fracture of the detent lug from the integral cantilever spring.

2. The connection recited in claim 1 between a motor vehicle body and a mast jacket of a steering column collapsible in the direction of a longitudinal centerline of the steering column in response to an impact thereon wherein the cam means comprises:

a spherical surface portion on the detent lug engaged by an edge of the mounting bracket when the snap-in capsule is translated into the capsule slot toward the seated position thereof.

3. The connection recited in claim 1 between a motor vehicle body and a mast jacket of a steering column collapsible in the direction of a longitudinal centerline of the steering column in response to an impact thereon wherein the cam means comprises:

a ramp surface on the detent lug engaged by an edge of the mounting bracket when the snap-in capsule is translated into the capsule slot toward the seated position thereof.

4. The connection recited in claim 1 between a motor vehicle body and a mast jacket of a steering column collapsible in the direction of a longitudinal centerline of the steering column in response to an impact thereon wherein the clamp means comprises:

an aperture in the snap-in capsule between the flat top thereof and a flat bottom thereof parallel to the flat top, and a fastener means in the aperture in the snap-in capsule cooperating with a screw-threaded bore in the body structure in rigidly clamping the snap-in capsule to the body structure with the flat top thereof flush against the body structure.

5. The connection recited in claim I between a motor vehicle body and a mast jacket of a steering column collapsible in the direction of a longitudinal centerline of the steering column in response to an impact thereon wherein:

the detent notch in the planar flange is adjacent to the end edge of the capsule slot.

* * * * *